(12) United States Patent
Macovaz et al.

(10) Patent No.: US 7,776,248 B2
(45) Date of Patent: Aug. 17, 2010

(54) SOCKETING OF PIPE

(75) Inventors: George Macovaz, Darlinghurst (AU); Peter Glanville Chapman, Greenwich (AU); Joshua Stanley Gotham, Westleigh (AU)

(73) Assignee: Vinidex Pty Limited, North Rocks (AU)

( * ) Notice: Subject to any disclaimer, the term of this patent is extended or adjusted under 35 U.S.C. 154(b) by 0 days.

(21) Appl. No.: 11/817,416

(22) PCT Filed: Mar. 13, 2006

(86) PCT No.: PCT/AU2006/000322

§ 371 (c)(1),
(2), (4) Date: Jul. 11, 2008

(87) PCT Pub. No.: WO2006/094361

PCT Pub. Date: Sep. 14, 2006

(65) Prior Publication Data

US 2009/0003926 A1 Jan. 1, 2009

(30) Foreign Application Priority Data

Mar. 11, 2005 (AU) .............................. 2005901213

(51) Int. Cl.
*B29C 57/02* (2006.01)

(52) U.S. Cl. ...................... 264/322; 264/339; 264/327; 264/296; 425/384

(58) Field of Classification Search ................ 264/40.6, 264/327, 339, 322, 296; 425/384
See application file for complete search history.

(56) References Cited

U.S. PATENT DOCUMENTS 2,571,416 A * 10/1951 Brown ........................ 65/281
3,755,528 A * 8/1973 Gutlhuber .................. 264/322
3,853,450 A * 12/1974 Acda .......................... 425/393
4,113,813 A * 9/1978 Wilson ....................... 264/296
4,150,087 A * 4/1979 de Putter et al. ............ 264/296
5,928,451 A * 7/1999 Johansson et al. .......... 156/242
6,146,572 A 11/2000 Visscher
2005/0230859 A1 10/2005 Hamaguchi et al.

FOREIGN PATENT DOCUMENTS

| CN | 1628953 | 6/2005 |
|---|---|---|
| EP | 1122485 | 8/2001 |
| EP | 1166005 B1 | 1/2004 |
| JP | 6039914 | 2/1994 |
| JP | 8085149 | 4/1996 |
| JP | 9193250 | 7/1997 |
| JP | 11221853 | 8/1999 |
| JP | 2000158529 | 6/2000 |
| RU | 2121406 C1 | 11/1998 |
| RU | 2230974 C2 | 6/2004 |
| WO | WO9315347 | 8/1993 |
| WO | WO9622184 | 7/1996 |

* cited by examiner

*Primary Examiner*—Kat Wyrozebski
*Assistant Examiner*—Scott W Dodds
(74) *Attorney, Agent, or Firm*—Gordon & Jacobson, PC

(57) ABSTRACT

A method of modifying compressive strains in formation of a pipe ring groove (16), in which a differential temperature profile is established across the pipe wall in a narrow bending locus ($l_3$) corresponding to the ring groove position, and the material is bent to form the ring groove. The temperature differential creates a differential in elastic modulus between the inner and outer surfaces of the pipe material, modifying the strain induced in inner concave and outer convex surfaces of the ring groove during the bending step.

33 Claims, 4 Drawing Sheets

Composite Beam in elastic bending

Composite Beam in elastic bending

SOCKETING OF PIPE

BACKGROUND OF THE INVENTION

1. Field of the Invention

The present invention relates to the post-forming of jointing formations—such as sockets or flanges—on pipes of plastics material, in which the material undergoes local bending during the post-forming process. The invention has particular application to the formation of ring grooves in the socketing of molecularly oriented plastic pipe and is described here in that context, but is not limited to that application.

2. Description of Related Art

Means of joining lengths of plastic pipe together are many and varied. Many of them involve the reforming of the end of the pipe by reheating and shaping to some desired profile to provide a means of mating with the opposing end of the next pipe through a clamp, socket, or coupling device. The art of forming sockets (also called bells) on plastics pipes is well established, and there are numerous processes and methods in the literature.

It is well established that molecular orientation of plastics can provide enhanced mechanical properties, and such materials are commonly used for plastics pipes. Orientation is achieved by drawing or stretching the material under appropriate conditions of temperature, such that a strain (i.e. deviation from the originally formed dimensions) is induced in the plastics material to cause alignment of the molecules, and cooling the material while drawn to lock in that strain. A number of methods have been proposed whereby this principle is applied to plastic pipes, in particular in order to enhance the burst strength under internal pressure by circumferential and/or axial drawing. Examples of such a method are those described in WO 90/02644 and WO2004/089605, which describe processes for production of biaxially (i.e. circumferentially and axially) oriented pipe.

In the case of oriented thermoplastics, the most common piping materials, the reforming of oriented material is not so simple, since the material will tend to revert if reheated, that is to say, the oriented molecular structure, which is itself created by a deformation process, will be lost. Further, the deformation processes applied to the socket may alter the orientation level in such a way that the strength or other mechanical properties of the material are adversely affected. This latter effect is discussed later in more detail with reference to FIG. 1.

Oriented PVC pipe is usually jointed by an integral socket formed on the end of the pipe as described in WO90/15949, U.S. Pat. No. 5,928,451, WO02/09926, and UK1,432,539. In these methods, the end of the pipe is enlarged to form a socket, either by mechanical or hydraulic means to force the material to conform to an external mould or internal mandrel.

WO90/15949 relates to an integral socket arrangement for a circumferentially or biaxially oriented plastics pipe, which was characterised by applying a differential axial draw ratio to the socket and the body of the pipe to produce the desired relative thickness and properties. In particular, that process provided a circumferentially or biaxially oriented plastics pipe comprising a body with an integral socket at one end thereof, with the socket wall having lesser axial draw than the body of the pipe.

Additionally, it is often desired to use a sealing ring to seal the connection formed by insertion of the pipe end into the enlarged socket. To accommodate this sealing ring, the socket will include an internal ring groove, typically formed by stretching the socket end over a specially-shaped mandrel enlarged about a circumferential locus to form an annular groove that will house a ring gasket of elastomeric material for sealing purposes.

In WO97/10942, there was described a method for creating a socket and ring groove in the end of a molecularly oriented pipe, including the step of heating the region of the socket in which the ring groove is to be formed to above the glass transition of the temperature of the material whilst maintaining the remainder of the socket below the glass transition temperature.

In the forming process, bending occurs at points of changes in direction of the surface, generating tensile or compressive strains in the material at that point. These strains add to or subtract from the strains generated in the orientation process and give rise to increased or decreased orientation. The bending stresses caused in formation of the ring groove have been found to modify the localised axial draw of the material in the vicinity of the ring groove, compared to the axial draw of the remainder of the socket. On the inside of the bend (i.e. the concave surface of the bend), the material of the ring groove is compressed (resulting in less axial draw), while on the outside of the bend (i.e. the convex surface of the bend) the axial draw will be increased. Along the neutral bending axis—extending approximately along the midpoint of the material section—the axial draw will be essentially unaltered.

This localised modification of axial draw can in some instances be a cause of weakness of the pipe socket through the ring groove.

SUMMARY OF THE INVENTION

The present invention aims to provide a method for post-forming a jointing formation, such as a socket with an annular ring groove, in a plastics pipe whereby localised changes during forming can be controlled so as to overcome or ameliorate these problems.

In a first form, the invention provides a method of post-forming a jointing formation in plastics material pipe, including the step of localised bending of the pipe wall at a bending locus, said bending step taking place whilst controlling a temperature profile across the material of the pipe wall to create a differential in elastic modulus of the pipe material between concave and convex surfaces of the bend at said bending locus.

Preferably, the step of controlling the temperature profile comprises differential heating and/or cooling of the pipe wall at said bending locus such that the temperatures of the concave surface is less than the temperature of the convex surface.

Preferably also, the pipe is a molecularly oriented plastics pipe.

Preferably, the jointing formation formed in the pipe comprises a socket of enlarged diameter and a circumferential ring groove, and the control of the temperature profile comprises establishing a differential in temperature between the inner and outer surfaces of the pipe at a locus substantially corresponding to the crest of the ring groove.

Optionally, the method further comprises establishing an opposite temperature differential across the pipe wall at positions substantially corresponding to the base of the ring groove.

The invention further provides a pipe made according to that method, and socketing apparatus adapted to perform the method.

Further aspects of the invention are as set out in the claims.

BRIEF DESCRIPTION OF THE DRAWINGS

Further preferred embodiments of the invention will now be described with reference to the accompanying drawings, in which.

DETAILED DESCRIPTION OF PREFERRED EMBODIMENTS

Figure 1:
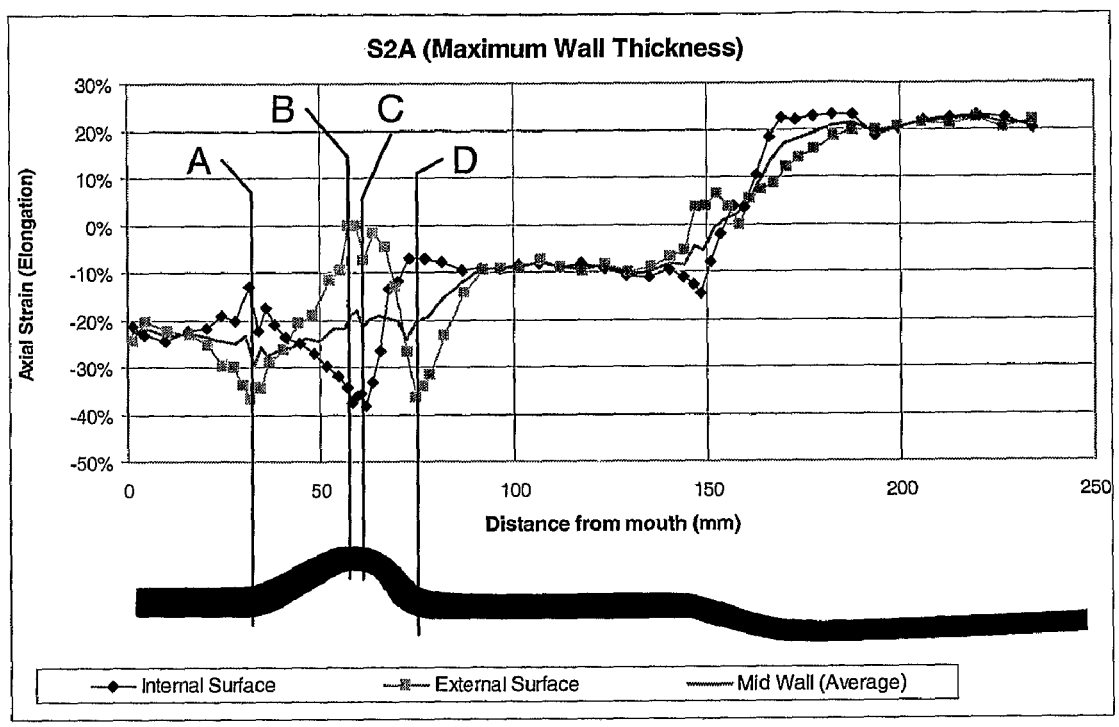
FIG. 1 is a graph of axial strain levels of the inner and outer surfaces, and the average strain, along the socket of an oriented plastics pipe according to the prior art.

FIG. 1 shows the axial strain levels (relative to the original axial dimensions of the pipe as extruded) developed on the inner and outer surface of a socket made generally in accordance with FIGS. 1 to 4A of WO97/10942.

These local strains were measured by scribing lines on the surface of the socket, and reverting by heat to the original extruded form, measuring the change in length between the scribed lines. The measurement is closely related to the level of molecular orientation and the tensile strength of the material. It can be seen that a positive strain or draw of over +20% in the body of the pipe has been reduced to a compressive strain by the belling process, averaging about −10% to −20% overall but reaching surface strains of nearly −40% where bending occurs in critical areas around the ring groove—at the inner surface of the material at the crest of the ring groove (points B and C) and at the outer surface of the material at points A and D. The low orientation in areas of compression results in very poor mechanical properties, and it has been verified under pressure test that such sockets are prone to premature failure by cracking at such points.

Figure 2:
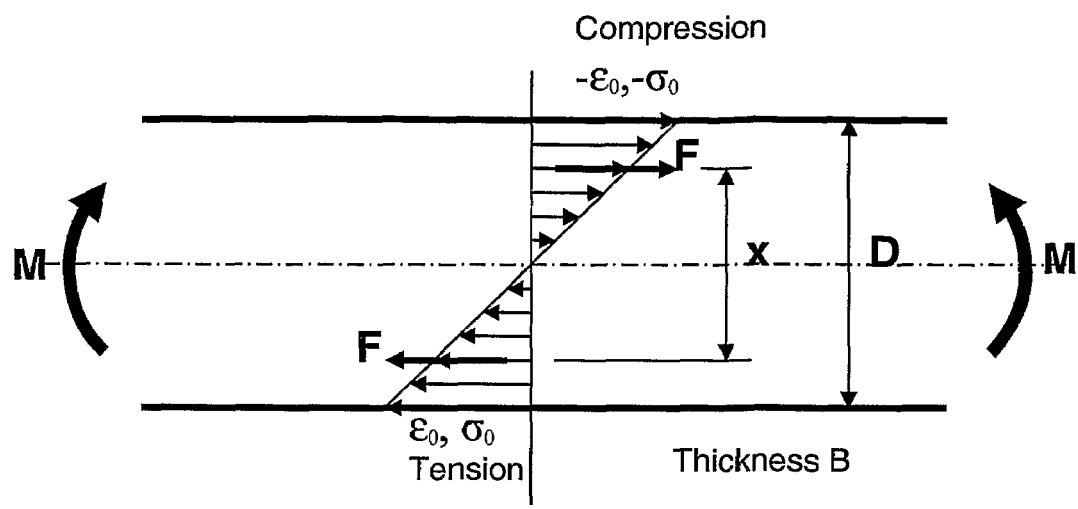
FIG. 2 is a schematic representation of stress ($\sigma_0$) and strain ($\epsilon_0$) profiles across the pipe wall of uniform elastic modulus when a bending moment is applied.

This localised modification of the strain by the bending may be further understood by reference to FIG. 2, which is a representation of conventional elastic beam theory whereby plane sections remain plane during bending, and a linear strain distribution is developed across the section, varying from $+\epsilon_0$ tensile strain at the bottom to $-\epsilon_0$ compressive strain at the top. For a uniform beam, the modulus is constant across the section and the diagram represents also the stress distribution $\sigma_0$ to $-\sigma_0$. The neutral axis of bending where strain and stress are zero is at the centre of the section.

This invention allows the distribution of strains developed during bending to be controlled to reduce the level of compression occurring at the concave surfaces of the critical points. This is achieved by controlling the temperature distribution across the section, to control the elastic modulus of the material.

Figure 3:
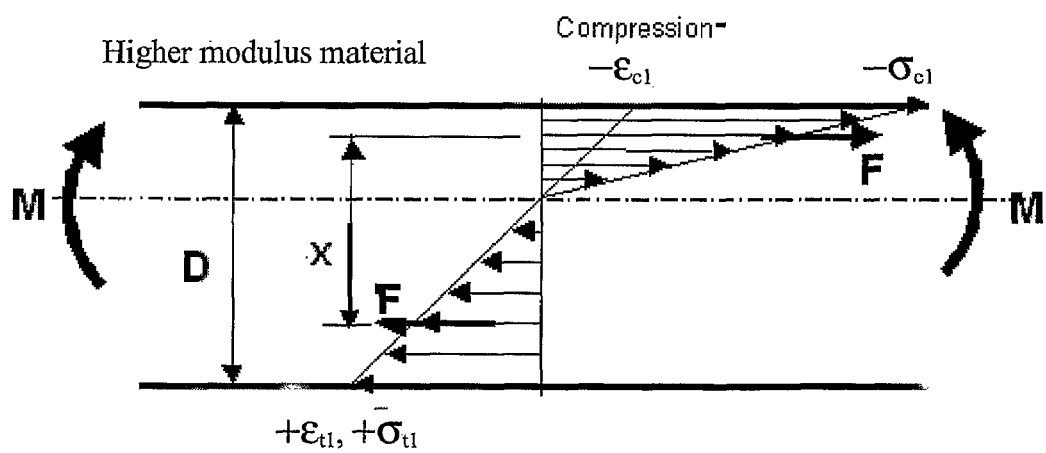
FIG. 3 is a schematic representation of stress ($\sigma_{t1}$, $\sigma_{c1}$) and strain ($\epsilon_{t1}$, $\epsilon_{c1}$) profiles across the pipe wall of non-uniform elastic modulus when a bending moment is applied.

With reference to FIG. 3, for non-uniform beams (for example composite beams of two or more different materials of different moduli), static force balance requires that the net force in compression be equal to the net force in tension. If the beam has a higher modulus on one half than the other, the stress developed by the strain will be higher, and in order to maintain the balance, the area over which the higher stress is applied must reduce. The neutral axis thus shifts towards that side as shown in FIG. 3. It can then be seen that the strain levels on that side are also reduced.

In this invention the compressive strain due to bending of the pipe wall section at the ring groove is reduced by introducing a localised temperature profile across the pipe wall at the critical point where such strains are being developed. For thermoplastics, the modulus is a function of temperature, increasing with decreasing temperature, and thus the objective is achieved by reducing the temperature of (or heating less) the inner surfaces of the bends so as to move the neutral axis of bending towards the inner surface of the bend. It will be appreciated that the same result can equally be achieved by heating more the outside of the bends at these points.

FIGS. 4 to 8 are side views illustrating a series of successive steps for forming a socket and ring groove on a biaxially oriented pipe according to one embodiment of the invention. The method and apparatus are modified from that described and shown in respect of FIGS. 1 to 4A of WO97/10942, and the disclosures of that document are incorporated herein by cross-reference.

Figure 4:
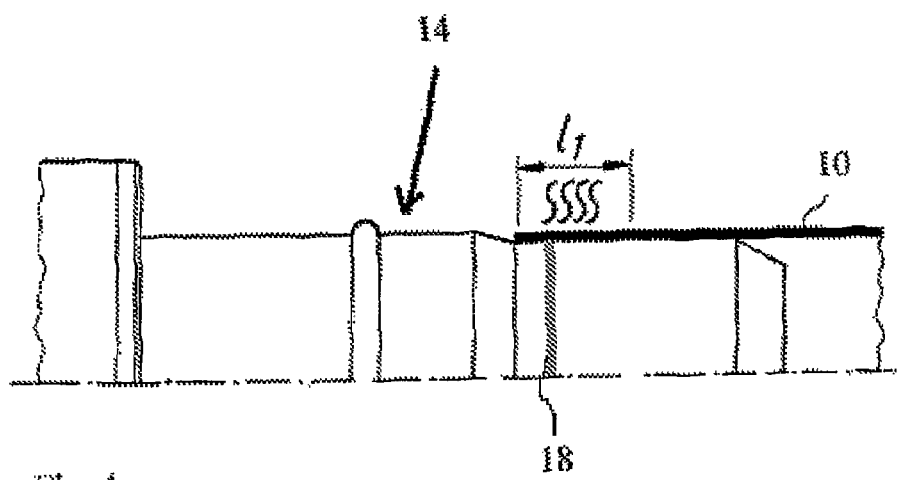
FIGS. 4 to 8 are schematic side views of a pipe and mandrel, showing successive steps in performing a socketing method according to one embodiment of the invention.

FIG. 4 shows the pre-formed, biaxially oriented plastics pipe 10 fed over and supported by the lead-in portion 12 of a mandrel 14 and the circumference of the pipe heated along a length $l_1$ at the end of the pipe. The heating may be achieved by any suitable means, for example by hot water, heating elements or by radiative heating such as infrared heating.

Figure 5:
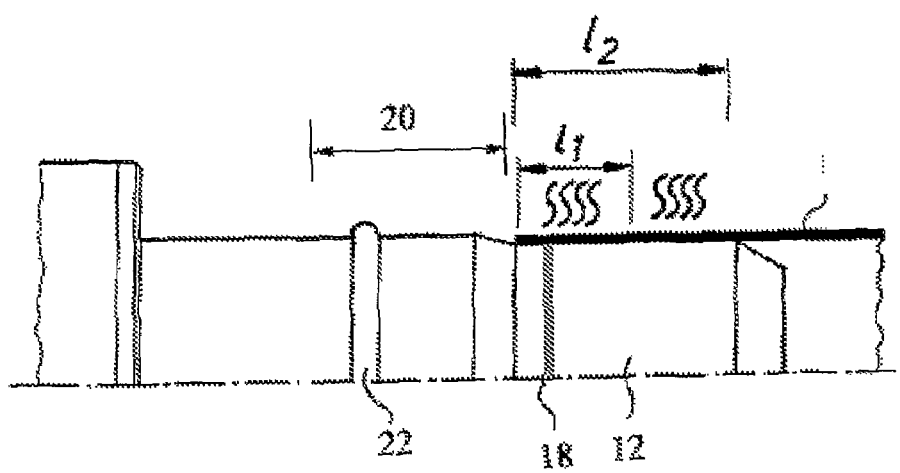

In the next step, shown in FIG. 5, the heating is applied over a longer length $l_2$, which incorporates $l_1$, so that the portion $l_1$ remains at a higher temperature than the remainder of $l_2$.

Figure 6:
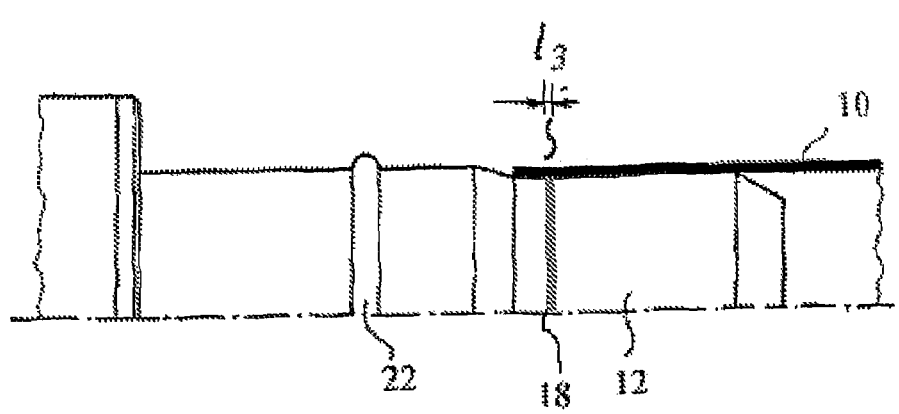

In FIG. 6, additional heating is applied to the outside surface of the pipe along a very short distance $l_3$, which corresponds to that part of the pipe which will form the crest of the ring groove 16 and the adjacent bends corresponding to B and C of FIG. 1 hereof.

In the corresponding position to $l_3$, the lead in portion of the mandrel is formed with a cooling ring 18 for cooling the inside surface of the pipe and thus forming a temperature differential across the pipe wall at this locus, the inside surface being cooler than the outer pipe surface. The cooling ring 18 is preferably formed of heat conductive material such as metal and may be cooled by any suitable means, such as water or air cooling. In one version, the cooling ring may include a perforated ring through which compressed air is applied to the inside of the pipe, the expansion of the air assisting cooling. The cooling ring may also scavenge the air expelled, or this may be allowed to escape from the end of the pipe.

Thus by the conclusion of the step of FIG. 6, the end portion of the pipe will have been temperature conditioned according to three different zones—an end portion $l_1$ which is hotter than the remainder of the portion $l_2$ which is to form the pipe socket, and a narrow sub-region $l_3$ of $l_1$ which has a temperature gradient across the pipe wall.

An axial thrust is then applied to the pipe to force the end of the pipe over the socket-forming portion 20 of the mandrel, and the portion $l_1$ over the knuckle 22 which forms the ring groove-forming part of the mandrel. This step is controlled so that the narrow locus $l_3$, which is shorter in length than the ring groove 16, corresponds to the crest of the ring groove.

Figure 7:
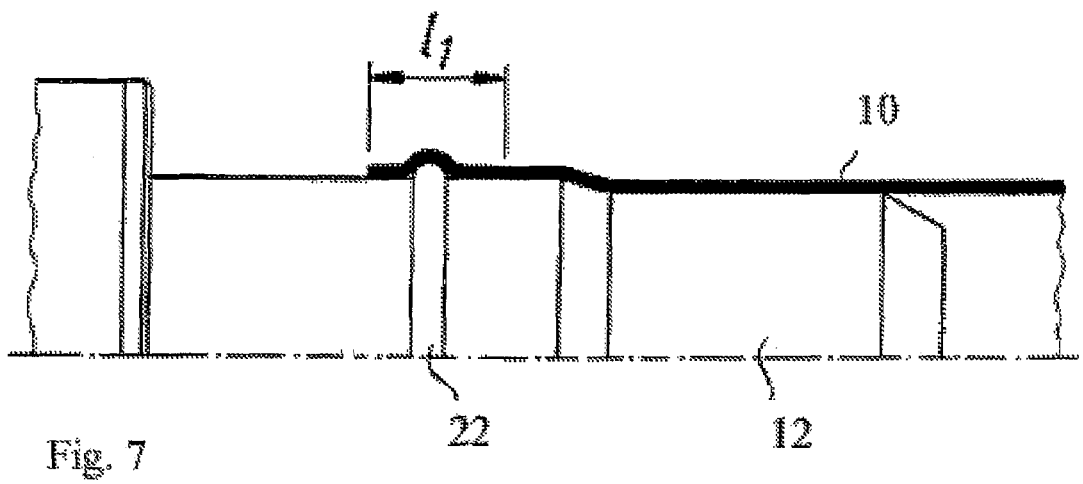

To accentuate the temperature differential across the pipe wall, the knuckle 22 of the mandrel may also be cooled, either by an internal cooling mechanism or by external pre-cooling prior to the step of FIG. 7, for example by providing an external cooling ring or by application of compressed or liquified gas whilst the pipe is undergoing the temperature conditioning steps of FIGS. 4 to 6.

By applying a differential temperature profile to the portion of the pipe wall, the inside of the pipe is cooler than, and thus has higher elastic modulus than, the outside of the pipe at this locus. The considerations discussed above with respect to FIG. 3 therefore apply, and localised compression of the inner, concave surface of the pipe due to the high bending stresses adjacent the crest of the ring groove is therefore reduced.

The desired temperature difference across the wall will vary depending on various factors, and may readily be either calculated or determined by routine experiment by a person skilled in the art. Relevant factors include the pipe material used, the amount of axial orientation of the pipe before forming of the socket, the minimum elongation strain or maximum compressive strain at the concave surface and the radius of curvature and material thickness at the bend.

A temperature differential of greater than 30° C., and preferably about 35° C. to 50° C., and more preferably about 40° C. to 45° C., has been determined by the inventors to be preferable for PVC pipe.

Figure 8:
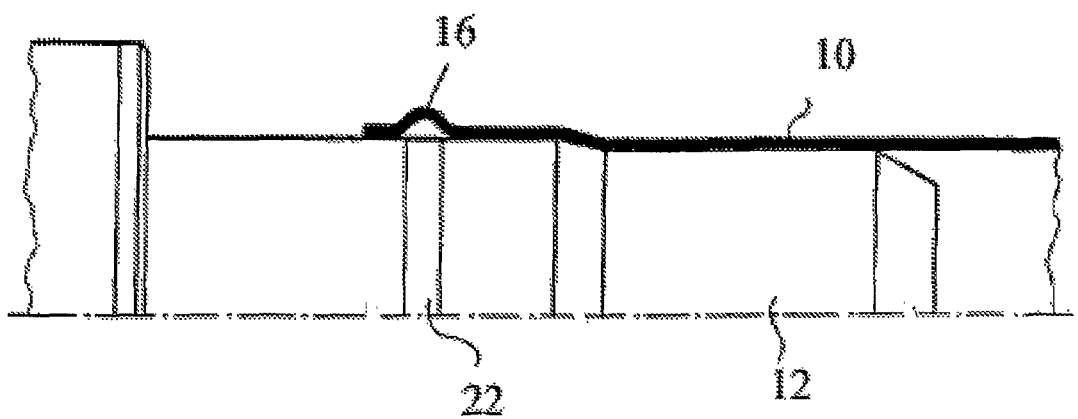

With reference to FIG. 8, the knuckle 22 of the mandrel is then retracted so that the pipe may be slid off the mandrel and the process repeated for the next pipe.

In an unillustrated embodiment, instead of forming the ring groove over a retractable knuckle of the mandrel, the ring groove may be formed over a pre-placed gasket ring which then slides off the mandrel with the socketed pipe, as is known in the art.

Optionally, in addition to modifying the temperature profile across the pipe wall at the crest of the ring groove as described above, differential heating and/or cooling may be applied to the pipe wall to create an opposite temperature profile at bending locii undergoing bending in the opposite direction, such as at the base of the ring groove (A and D in FIG. 1). It will be appreciated that this may be achieved by similar heating and cooling means as those described above, but with the heating and cooling positions reversed at these bending locii.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise, comprised and comprises where they appear.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

The invention claimed is:

1. A method of forming a feature in a pipe wall of a plastic pipe, the pipe wall having a first surface disposed opposite a second surface, the method comprising:
   (i) providing a heating source for heating the first surface of the pipe wall;
   (ii) providing a cooling source for cooling the second surface of the pipe wall;
   (iii) providing a localized temperature gradient across the pipe wall between a localized portion of the first surface and a localized portion of the second surface by utilizing the heating source to apply heat to the localized portion of the first surface and utilizing the cooling source to remove heat from the localized portion of the second surface; and
   (iv) concurrent with (iii), bending the pipe wall at the localized portions of the first and second surfaces to form the feature, wherein the feature has a convex surface formed from the localized portion of the first surface and a concave surface formed from the localized portion of the second surface,
   wherein the localized temperature gradient provided across the pipe wall during bending of the pipe wall in (iv) causes
   a neutral axis of bending in the pipe wall to shift toward the concave surface and away from the convex surface and
   compressive strain which arises at and adjacent the concave surface during formation of the feature to be reduced.

2. A method according to claim 1, further comprising:
prior to (iii), applying heat to at least one lengthwise zone of the pipe that is longer than and encompasses at least one of the localized portions of the first and second surfaces of the pipe.

3. A method according to claim 2, wherein:
the at least one lengthwise zone includes first and second lengthwise zones, and prior to (iii), heat is sequentially applied to the first and second lengthwise zones.

4. A method according to claim 3, wherein:
the first lengthwise zone is smaller than and encompassed by the second lengthwise zone of the pipe.

5. A method according to claim 1, wherein:
the pipe includes a circumferential ring groove, the feature includes a first crest of the circumferential ring groove, the first surface is an outer surface of the pipe wall, and the second surface is an inner surface of the pipe wall.

6. A method according to claim 5, wherein:
the circumferential ring groove is part of a socket formed in the plastic pipe.

7. A method according to claim 6, wherein:
the pipe has a diameter, the socket has a diameter which is greater than the diameter of the pipe, and the ring groove has a diameter which is greater than the diameter of the socket.

8. A method according to claim 1, wherein:
the pipe includes a circumferential ring groove, the feature includes a base of the circumferential ring groove, the first surface is an inner surface of the pipe wall and the second surface is an outer surface of the pipe wall.

9. A method according to claim 1, wherein:
the pipe is a molecularly oriented plastic pipe.

10. A method according to claim 1, wherein:
the pipe is a PVC pipe.

11. A method according to claim 1, wherein:
the localized temperature gradient provided across the pipe wall creates a stress to strain ratio differential between the different localized portions of the pipe wall during and after bending of the pipe wall.

12. A method according to claim 11, wherein:
the localized temperature gradient provided across the pipe wall increases a stress to strain ratio of the localized portion of the pipe wall at and adjacent the concave surface relative to a stress to strain ratio of the localized portion of the pipe wall at and adjacent the convex surface during and after bending of the pipe wall at (iv).

13. A method according to claim 1, wherein:

the cooling source actively transports heat away from the localized portion of the second surface, and is at least one of a cooling ring, a compressed gas, and a liquefied gas.

14. A method according to claim 1, wherein:

the heating source actively transports heat to the localized portion of the first surface, and is at least one of a hot water source, a heating element source, and a radiative heating source.

15. A method according to claim 1, wherein:

the cooling source is for localized cooling.

16. A method according to claim 1, wherein:

the heating source is for localized heating.

17. A method according to claim 1, wherein:

the pipe is PVC pipe, and the localized temperature gradient provided across the pipe wall is greater than 30° C.

18. A method of forming a bend of a circumferential ring groove in a pipe wall of a plastic pipe, the pipe wall having a first surface disposed opposite a second surface, the method comprising:

(i) providing a heating source for heating the first surface of the pipe wall;

(ii) providing a cooling source for cooling the second surface of the pipe wall;

(iii) providing a localized temperature gradient across the pipe wall between a localized portion of the first surface and a localized portion of the second surface by utilizing the heating source to apply heat to the localized portion of the first surface and utilizing the cooling source to remove heat from the localized portion of the second surface; and (iv) concurrent with (iii), bending the pipe wall at the localized portions of the first and second surfaces to form the bend of the ring groove, wherein the bend has a convex surface formed from the localized portion of the first surface and a concave surface formed from the localized portion of the second surface, wherein the localized temperature gradient provided across the pipe wall during bending of the pipe wall in (iv) causes a neutral axis of bending in the pipe wall to shift toward the concave surface and away from the convex surface and compressive strain which arises at and adjacent the concave surface of the bend during bending at (iv) to be reduced.

19. A method according to claim 18, further comprising:

prior to (iii), applying heat to at least one lengthwise zone of the pipe that is longer than and encompasses at least one of the localized portions of the first and second surfaces of the pipe.

20. A method according to claim 19, wherein:

the at least one lengthwise zone includes first and second lengthwise zones, and prior to (iii), heat is sequentially applied to the first and second lengthwise zones.

21. A method according to claim 20, wherein:

the first lengthwise zone is smaller than and encompassed by the second lengthwise zone of the pipe.

22. A method according to claim 18 wherein:

the bend formed at (iv) is a crest of the ring groove, the first surface is an outer surface of the pipe wall, and the second surface is an inner surface of the pipe wall.

23. A method according to claim 18, wherein:

the bend formed at (iv) is a base of the ring groove, the first surface is an inner surface of the pipe wall and the second surface is an outer surface of the pipe wall.

24. A method according to claim 18, wherein:

the circumferential ring groove is part of a socket, the pipe has a diameter, the socket has a diameter which is greater than the diameter of the pipe, and the ring groove has a diameter which is larger than the diameter of the socket.

25. A method according to claim 18, wherein:

the pipe is a molecularly oriented plastic pipe.

26. A method according to claim 18, wherein:

the pipe is a PVC pipe.

27. A method according to claim 18, wherein:

the localized temperature gradient provided across the pipe wall creates a stress to strain ratio differential between the different localized portions of the pipe wall between the convex and concave surfaces during and after bending of the pipe wall at (iv).

28. A method according to claim 27, wherein:

the localized temperature gradient provided across the pipe wall increases a stress to strain ratio of the localized portion of the pipe wall at and adjacent the concave surface relative to a stress to strain ratio of the localized portion of the pipe wall at and adjacent the convex surface during and after bending of the pipe wall at (iv).

29. A method according to claim 18, wherein:

the cooling source actively transports heat away from the localized portion of the second surface, and is at least one of a cooling ring, a compressed gas, and a liquefied gas.

30. A method according to claim 18, wherein:

the heating source actively transports heat to the localized portion of the first surface, and is at least one of a hot water source, a heating element source, and a radiative heating source.

31. A method according to claim 18, wherein:

the cooling source is for localized cooling.

32. A method according to claim 18, wherein:

the heating source is for localized heating.

33. A method according to claim 18, wherein:

the pipe is PVC pipe, and the localized temperature gradient maintained across the pipe wall is greater than 30° C.

* * * * *